(12) United States Patent
St-Germain et al.

(10) Patent No.: US 6,762,563 B2
(45) Date of Patent: Jul. 13, 2004

(54) MODULE FOR POWERING AND MONITORING LIGHT-EMITTING DIODES

(75) Inventors: Nicolas St-Germain, St-Bruno (CA); Reynald Gélinas, Ile-Perrot (CA)

(73) Assignee: Gelcore LLC, Valley View, OH (US)

( * ) Notice: Subject to any disclaimer, the term of this patent is extended or adjusted under 35 U.S.C. 154(b) by 0 days.

(21) Appl. No.: 10/370,286

(22) Filed: Feb. 20, 2003

(65) Prior Publication Data

US 2003/0209997 A1 Nov. 13, 2003

Related U.S. Application Data

(63) Continuation-in-part of application No. 09/996,300, filed on Nov. 28, 2001, now Pat. No. 6,597,179, which is a continuation-in-part of application No. 09/543,240, filed on Apr. 5, 2000, now abandoned.

(30) Foreign Application Priority Data

Nov. 19, 1999 (CA) ............................................. 2290203

(51) Int. Cl.[7] .............................................. H05B 37/02
(52) U.S. Cl. ........................ 315/129; 315/130; 315/247
(58) Field of Search ................................. 315/129, 130, 315/131, 132, 247; 363/74

(56) References Cited

U.S. PATENT DOCUMENTS

| 6,150,771 A | 11/2000 | Perry |
| 6,392,553 B1 | 5/2002 | Mollet et al. |
| 6,498,440 B2 * | 12/2002 | Stam et al. ................. 315/291 |

FOREIGN PATENT DOCUMENTS

| CA | 2225005 A1 | 12/1997 |
| EP | 0746186 A1 | 12/1996 |
| FR | 2 646 538 A1 | 11/1990 |
| FR | 2 724 749 A1 | 3/1996 |
| WO | WO 99/07186 A2 | 2/1999 |
| WO | WO 99/56504 A1 | 11/1999 |

* cited by examiner

*Primary Examiner*—David Vu
(74) *Attorney, Agent, or Firm*—Darby & Darby (57) ABSTRACT

LED lamp circuitry that emulates an incandescent lamp's behavior upon remote verification of the LED lamp. The LED lamp circuitry presents an input power switch circuit, a fuse blow-out circuit and a cold filament detection circuit permitting the use of LED lamps in applications, such as railway signal light applications, where there is a need for remote monitoring of the lamps, while keeping the advantageous features of lower power consumption and longer life.

6 Claims, 11 Drawing Sheets

MODULE FOR POWERING AND MONITORING LIGHT-EMITTING DIODES

RELATED APPLICATIONS

This application is a continuation-in-part of U.S. application Ser. No. 09/996,300, filed on Nov. 28, 2001 now U.S. Pat. No. 6,597,179, which is a continuation-in-part of U.S. application Ser. No. 09/543,240 filed on Apr. 5, 2000, now abandoned.

FIELD OF THE INVENTION

The present invention relates to the electric power supply of light-emitting loads, in particular light-emitting diode (LED) lamps that require remote monitoring.

BACKGROUND OF THE INVENTION

Light-emitting diode (LED) lamps are becoming more and more popular in automotive traffic lights, railway signal lights and other applications. Their lower power consumption is an attractive feature, but the main reason for their popularity is their long life (100 000 hours) compared to standard incandescent lamps (5 000 hours). Manifestly, these features allow important reduction in maintenance costs.

In certain applications, such as railway signal lights, these lamps may be used, as those skilled in the art would know, for main line signalling and/or grade crossing signalling. Grade crossing signals are usually situated in populated areas such as road intersections and redundant signals are used. Remote monitoring of the LED lamps in grade crossing signals is therefore not common. Main line signals, on the other hand, can be installed in remote areas, which are not easily accessible. Remote monitoring for checking the integrity of the lamps signals is therefore common practice in order to be able to downgrade the aspect in case of a detected signal failure.

For lamps equipped with standard incandescent bulb, electrical integrity can be easily verified. If the filament of the incandescent bulb is in normal condition, current flows through the bulb according to Ohm's law (I=V/R). Otherwise, if the filament is open, no current flows through the bulb and it should be replaced.

For LED lamps, however, LED current is controlled by a power supply. Current characteristics are therefore not identical in a LED lamp and in an incandescent lamp. In a LED lamp, alternative current (ac) line voltage is rectified and then converted to a suitable level by a dc—dc (direct current) converter, which also regulates LED current. In case of LED failure, or failure of any other electrical component in the LED lamp, it is possible for the power supply to continue drawing current at or near the nominal current value, even if the LED's are not emitting any light. Remote monitoring systems could therefore see the LED lamp as functioning correctly when in reality it is not. This situation is not acceptable since it can lead to very hazardous train operations and cause major accidents.

Another problem, related to LED lamps and their power supplies and controllers, is caused by electric components which retain residual voltage differentials after power is removed from the LED lamp. The resulting characteristic is that a LED lamp will effectively light up when the power applied to it reaches a first high level while it will be turned off only when the power reaches a second lower level. The resulting problem is that if a certain power is induced by, for example, other nearby cables, the LED lamp could remain on while in fact it should be off. This could also lead to dangerous situations.

These particularities of LED lamps limit their widespread use in situations where they need to be remotely monitored such as in railway main line signalling applications.

OBJECTS OF THE INVENTION

An object of the present invention is therefore to allow LED lamps to become compatible with remote detection systems designed for monitoring of incandescent lamps.

Another object of the invention is to provide LED lamp circuitry which will emulate an incandescent lamp's behavior upon remote monitoring of the LED lamp.

Yet another object of the invention is to provide a control circuit for enabling/disabling the power supply to LED lamps in relation to the level of the line voltage.

SUMMARY OF THE INVENTION

According to the present invention, there is provided a module for powering and monitoring a light-emitting diodes load by means of a power line, the module comprising:

an input power switch circuit having an input connected to the power line for receiving power from the power line and monitoring a voltage magnitude thereof to enable and disable the module according to the voltage magnitude of the power line;

a fuse blowout circuit having a fuse through which the input power switch circuit monitors the voltage magnitude of the power line, said fuse blowout circuit being adapted for blowing out said fuse to disable the input power switch circuit if no current flows through the light-emitting diodes load after a pre-determined time when the input power switch circuit is activated;

a cold filament test circuit having an input connected to the power line for emulating an impedance of an incandescent light during a power stage set-up time during which no current is supplied to the light-emitting diodes load;

a current detector circuit for detecting a current supplied to the light-emitting diodes load and for disabling the fuse blowout circuit and the cold filament test circuit when the current of the light-emitting diodes load reaches a predetermined current level; and a boost power stage circuit having an input connected to the power line and an output connected to the light-emitting diodes load for powering the light-emitting diodes load.

Preferably, the module further comprises a serpentine trace connected in series with the fuse of the fuse blow out circuit for disabling the input power switch circuit upon physical damage to the serpentine trace.

Preferably, the module comprises an input filter circuit connected between the power line and the input power switch for protecting the module.

Preferably, a dummy load resistor is connected across the power line after the power switch circuit to cancel out a negative slope effect on an input impedance of the module.

Preferably, the module further comprises a start-up circuit having a first input connected to the input filter circuit and a second input connected to the current detection circuit, and having an output connected to the boost power stage circuit for starting up the module.

Preferably, the boost power stage circuit has an output capacitor and the module further comprises a quick-bleeder circuit having an input connected to the output capacitor for forcing the output capacitor to discharge at a faster rate through a shunt resistor when the module is turned off.

The embodiments described herein present the advantage that they permit the use of LED lamps in applications, such as railway signal light applications, where there is a need for remote monitoring of the lamps, while keeping the advantageous features of lower power consumption and longer life.

Other objects, advantages and features of the present invention will become more apparent upon reading of the following non-restrictive description of preferred embodiments thereof, given by way of example only with reference to the accompanying drawings.

DETAILED DESCRIPTION OF THE PREFERRED EMBODIMENTS

Figure 1:
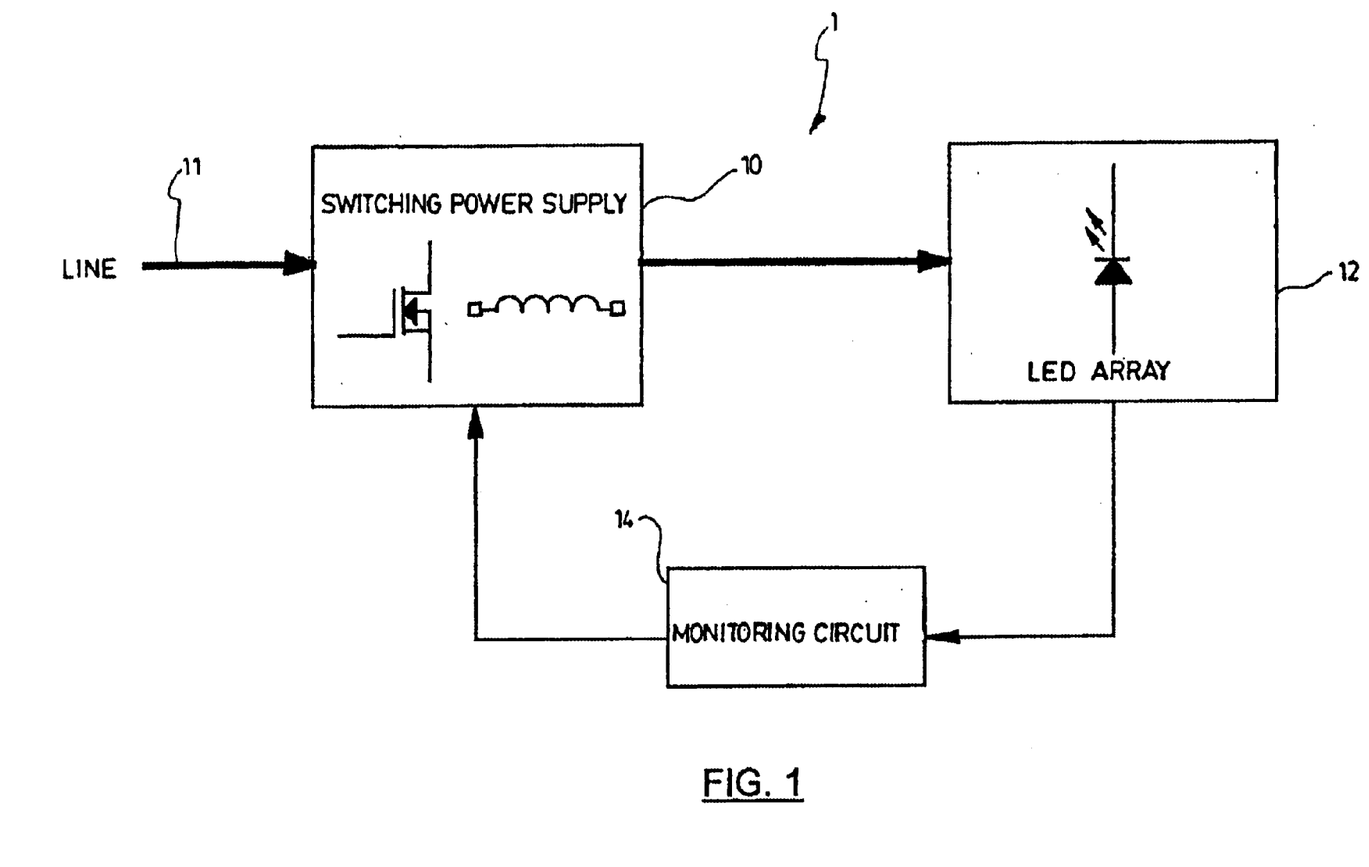
FIG. 1 is a schematic block diagram showing a LED module including a functional circuitry, a light source LED array, and a safety circuitry according to a preferred embodiment of the present invention.

Referring to FIG. 1, a dc (direct current) line voltage is supplied to an LED (light-emitting diodes) module 1 via line 11. The LED module 1 consists of a functional circuitry 10, a PCB (printed circuit board) LED light source array 12 and a safety circuitry 14.

The functional circuitry 10 includes an input power switch circuit 22 (shown in FIG. 2) that typically converts a +10 Vdc input voltage to an 100 mA output constant current for the Red, White and Yellow LEDs, and 60 mA for the Green LEDs of the LED light source array 12.

The safety circuitry 14 includes a fuse blow out circuit 30 and a LED current detector circuit 38 (shown in FIG. 2) that monitors the LED's current and turns off permanently the input power switch circuit 22 (see FIG. 2) by blowing the FBO fuse when the LEDs current is typically below 20% of its nominal value.

The PCB LED light source array 12 may be, for example, a matrix of high-brightness 5 mm LEDs configured for redundancy. As will be described further below, the current flowing in the LEDs is regulated by a PSU's (Power Supply Unit) feedback loop providing constant light flow. The LEDs preferably form a pattern made of 4 columns (one group of 4 LEDs connected in parallel) by 22 rows (22 groups connected in series) for the Red LEDs, 4×33 for the Yellow LEDs and 6×15 for the Green and White LEDs. In case of an LED failure in a group over the course of operation, the current is redistributed to the other LEDs of the same group and the signal maintains its light output. The LEDs are also more generally referred to in the present specification as light-emitting diode loads. Various embodiments of LED arrays can be used. These embodiments are well known to those of ordinary skill in the art and, accordingly, will not be further described in the present specification.

Figure 2:
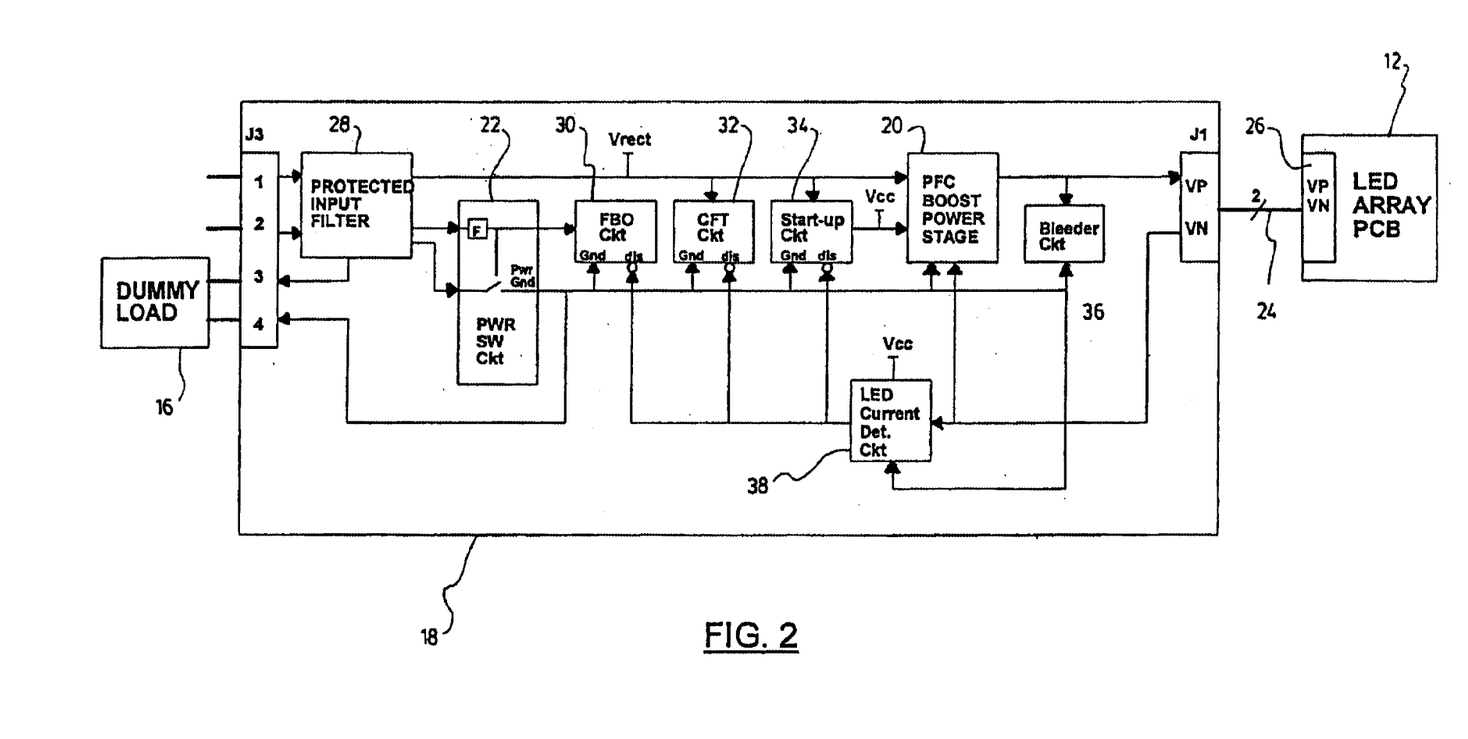
FIG. 2 is a functional block diagram of a LED module according to a preferred embodiment of the present invention.

Referring now to FIG. 2, the LED module 1 may be made of 3 physical parts: the PCB LED array 12, a dummy load 16 and a PCB PSU (power supply unit) 18.

Dummy Load

The input line current is monitored by the system LOD (light out detection) function that consists to check if the lamp is functional or not. In a preferred embodiment, the module 1 detects a Light Out if the input current is below a predetermined value.

The PSU 18 regulates the LEDs current in order to maintain constant light intensity. The power stage circuit 20 provides output constant power and assuming that the internal losses are almost constant for different input voltage conditions, it could be assumed that the input power delivered to the PSU 18 is constant. Having a constant input power, the line current amplitude is higher at 8 Vdc and lower at 16 Vdc. In terms of input impedance, the PSU 18 has a negative slope resistance.

A dummy load resistor 16 may be added across the input line to cancel out the negative slope effect of the PSU's input impedance. The input power switch circuit 22 isolates the dummy load when the PSU 18 is off.

PSU PCB

The +10 Vdc input line voltage is fed to the PSU PCB 18 via the connector J3. The connector J3 provides also an interface connection to feed the +10 Vdc to the dummy load resistor 16 when the power switch circuit 22 turns on. The PSU's power stage circuit 20 converts the +10 Vdc to a constant current that flows in the LEDs 12 via the wiring cable 24 connected to connector J1 and the LED array PCB connector 26.

As shown in FIG. 2, the PSU 18 provides the following functions that will be described below:

protected input filter circuit 28;

input power switch circuit 22;

fuse blow out (FBO) circuit 30;

cold filament test (CFT) circuit 32;

start-up circuit 34;

power stage circuit 20;

bleeder circuit 36;

LED current detection circuit 38;

Connectors

Figure 3:
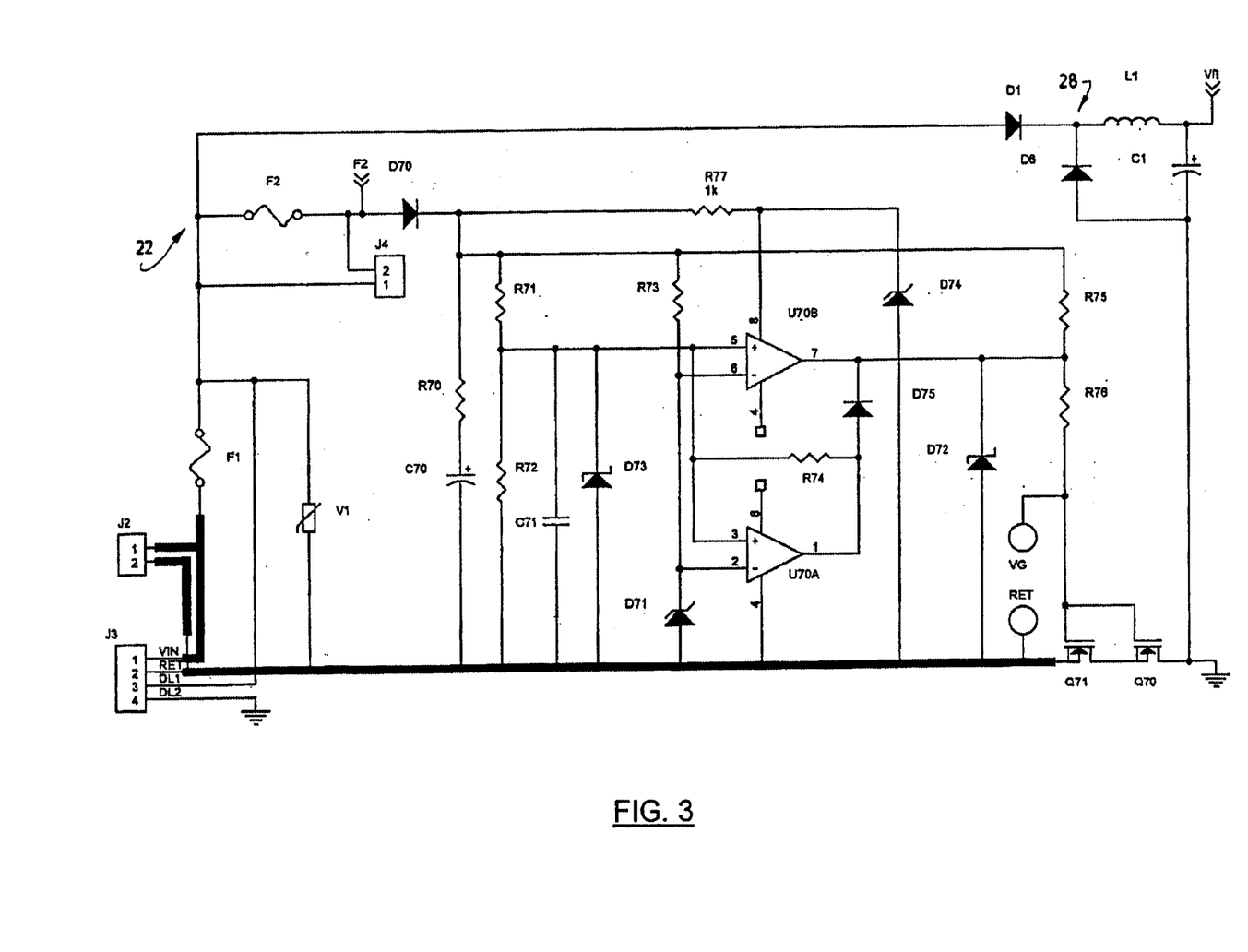
FIG. 3 is an electrical circuit diagram of a combined protected input filter circuit and input power switch circuit according to a preferred embodiment of the present invention.

The connector J3 is a 4 circuits connector that is used to mate the +10 Vdc voltage source and the dummy load wires with AWG 16 wires, as shown in FIG. 3. The connectors J2 and J4 that are illustrated in FIG. 3 are used only for testing the PSU 18 during the manufacturing process to verify the main functions of the PSU 18.

Protected Input Filter Circuit

Referring to FIGS. 2 and 3, the protected input filter circuit 28 provides protection against the PSU's internal overload, input voltage reverse polarity and line voltage surges. The protected input filter circuit 28 filters the switching frequency of the power stage input current in order to meet FCC conducted and radiated FCC Class A EMC.

Referring to FIG. 3, the fuse F1 provides protection against overload greater than 2A. The power supply has a constant output current and that condition will occur only when a component fails short as described above.

The diode D1 provides protection against reverse polarity connection. The diode D1 may be a MUR420 diode having a current rating of 4A and can handle the input line current that can vary between 1.2 and 2A.

The PSU 18 may withstand a surge of 1000 volts 1.2/50 $\mu$s open circuit voltage and a 8/20 $\mu$s short circuit current surge having a source impedance of 2 ohms. The varistor V1 clamps $V_{IN}$ to 170V when subjected to these threats.

The switching frequency of the power stage input current is filtered by L1 and C1. Measurements of the conducted and radiated emission show that the EMC specifications are met.

Input Power Switch Circuit

Railroads safety issue requires a circuit to control the turn-on and turn-off of the LED module 1. The implementation of the input power switch circuit 22 of the PSU 18 provides such protection against out of range low input voltage.

The input power switch circuit 22 has a turn-on feature that monitors the input line voltage. The specifications typically require to turn on the light signal at 8 Vdc and to turn it off at 4 Vdc. The input power switch circuit 22 is therefore designed to turn on when the input line voltage exceeds 7 Vdc and turns off below 5.5 Vdc providing sufficient margins.

Referring to FIG. 3, there is shown a combined protected input filter and input power switch circuit. The input power switch circuit 22 shown in FIG. 2 is linked to the input voltage by a 125 mA fuse F70 that is shown in FIG. 3. The fuse F70 blows when a FBO (fuse blow out) command is enabled at line F2. That way the PSU 18 will turn off and the CFT (cold filament test) circuit 32 will detect a failure by the system's controller as will be explained further below.

Figure 10:
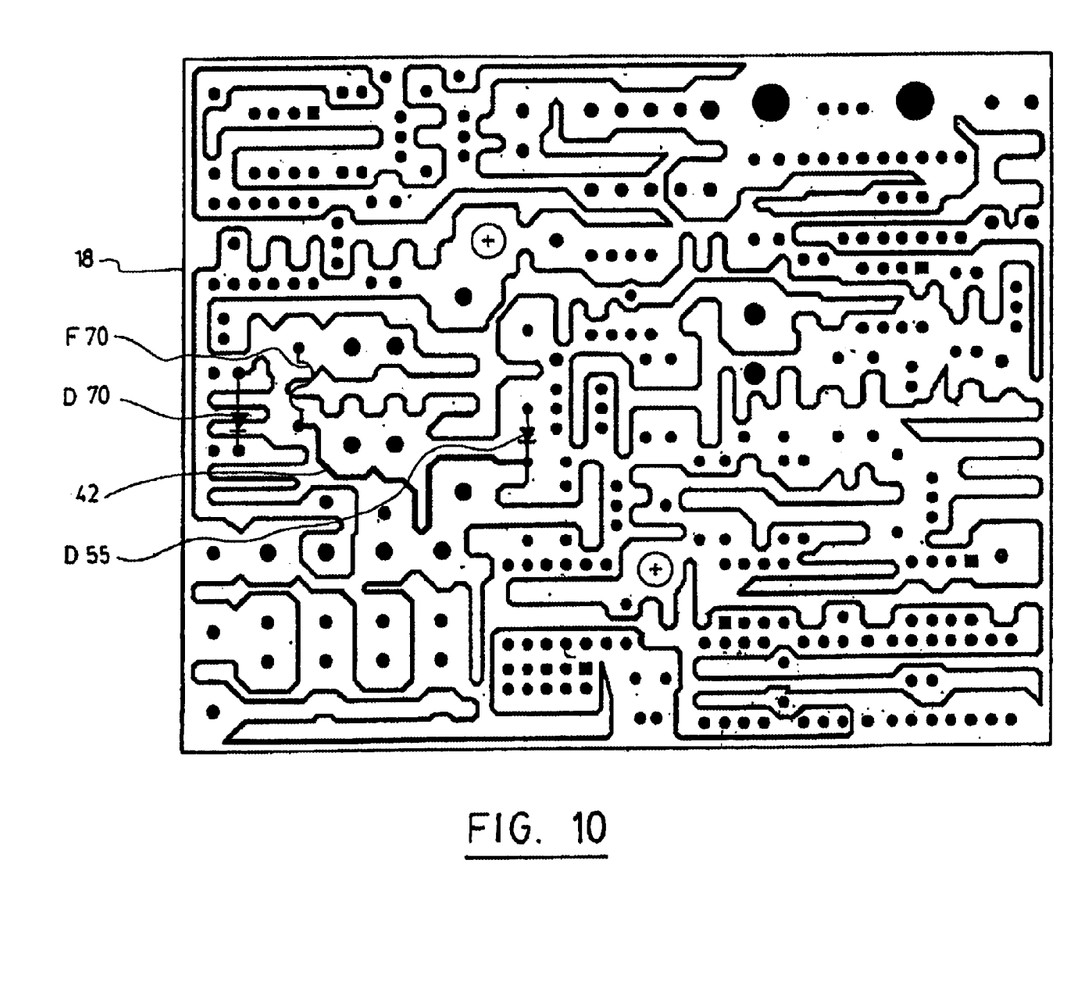
FIG. 10 is a top view of a power supply unit with a serpentine trace for detecting physical damage thereof.

Also, to make sure that upon physical damage of the signal (by bullet or other impact) the input switch is kept off, a serpentine trace 42 (shown in FIG. 10) is added in series with fuse F70 all around the PSU 18. This trace occupies a complete layer of a multi-layer PCB so that if a bullet penetrates the power supply PCB 18 or if the power supply's PCB 18 is damaged, the trace 42 opens. This is equivalent as having the fuse F70 blown and ensures detection of a dark signal in case of physical damage.

Referring to FIG. 3, the function of diode D70 is to prevent capacitor C70 from discharging when the FBO command is activated at line F2. This occurs when fuse F70 is shorted to ground. The energy bank of capacitor C70 keeps mosfets Q70 and Q71 on long enough to blow fuse F70 when the FBO circuit 30 is activated. The resistor R70 provides the adequate time constant with capacitor C70 to allow the FBO circuit 30 to open fuse F70 when required. Furthermore, the resistor R70 limits the inrush current through fuse F70 at turn-on.

The mosfets Q70 and Q71 which act as a power switch provide the function of a solid state switch that isolates the power stage circuit 20 when the input voltage is below the input voltage range. The mosfets Q70 and Q71 turn on when the voltage at line 3 of comparator U70A reaches 1.225V and turns off when it is below it. Diode D71 is a 1.225V high precision voltage reference diode that is stable under temperature variations. Resistor R73 limits the bias current of diode D71. Resistors R71 and R72 form the voltage divider that reduces down the input voltage to be compared to the voltage reference. The comparators U70A and U70B combined with the hysteresis resistor R74 provide noise immunity against false triggering signals. Diode D75 forces line 1 of comparator U70A to LOW when comparator U70B reacts faster than comparator U70A. Line 7 of comparator U70B provides the interface command of the mosfets Q70 and Q71 acting as the power switch.

Diodes D71, D72, D73 and D74 provide immunity against the varistor V1 clamped voltage lightning surge. Resistor R77 limits the current when input line voltage surge occurs.

LED Current Detection Circuit

Figure 4:
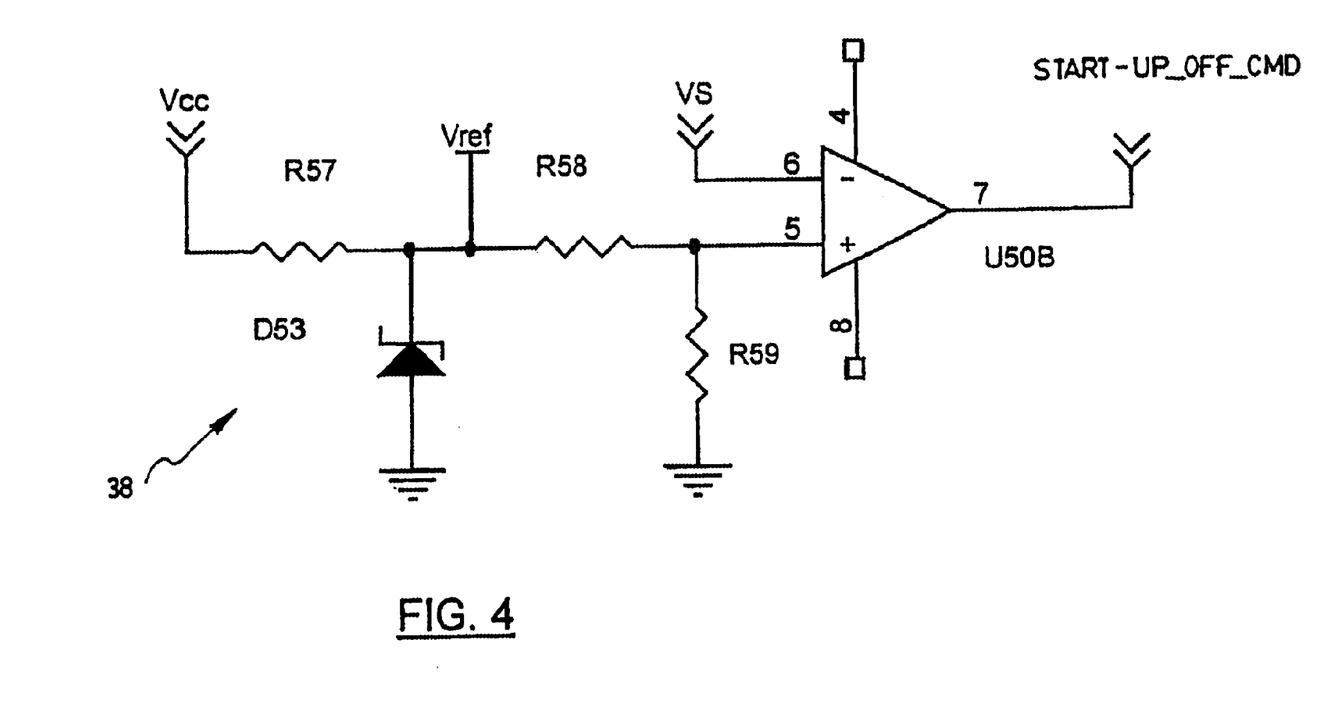
FIG. 4 is an electrical circuit diagram of a LED current detection circuit shown in FIG. 2 according to a preferred embodiment of the present invention.

Referring to FIG. 4, the LED current detection circuit 38 disables the FBO, CFT and start-up circuits 30, 32, 34 when the LED current exceeds 20% of its nominal value. If the LED current does not reaches 20% of $I_{NOM}$ within 300 ms then the FBO circuit 30 blows out F70 and the PSU 18 turns off.

In the current detection circuit 38, the voltage sense $V_S$ (the voltage across the current sense resistor) is compared to a reference voltage. In normal operation, voltage sense $V_S$ is regulated at 2.5V and the reference voltage is set at 17% of the nominal value. The 4.7V zener diode D53 is biased by resistor R57 from voltage $V_{CC}$ to provide voltage $V_{REF}$ and the voltage divider resistors R58 and R59 reduce voltage $V_{REF}$ to 0.43V or 17% of nominal current $I_{NOM}$ providing a margin of 3%. Voltage sense $V_S$ is applied at line 6 of comparator U50B (inverted input) and the 0.45V reference voltage at line 5 of comparator U50B (non-inverted input). At turn-on, voltage sense $V_S$ is 0V and the comparator output at line 7 of comparator U50B-7 is floating (LM2903 is an open collector comparator) which enable the FBO, CFT and start-up circuits 30, 32, 34 to operate. Typically after 50 ms, voltage sense $V_S$ reaches 0.43V and line 7 of comparator U50B is shorted to ground to disable the FBO, CFT and start-up circuits 30, 32, 34. The time taken by voltage sense $V_S$ to reach 0.43V depends directly to the input line voltage amplitude, the amount of LEDs in series and the forward voltage of the LEDs.

Fuse Blow Out (FBO) Circuit

Figure 5:
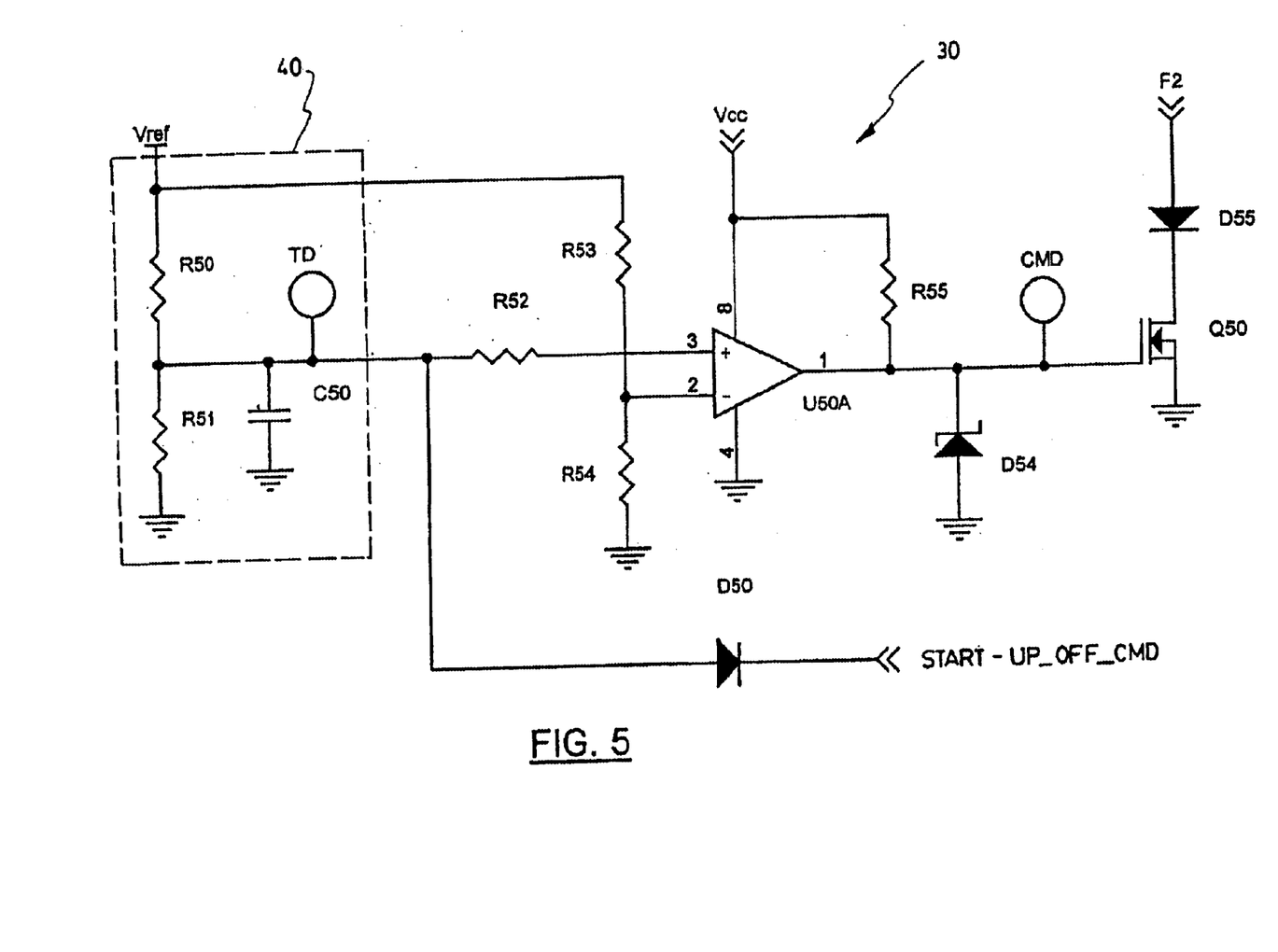
FIG. 5 is an electrical circuit diagram of a time delay FBO (Fuse Blow Out) circuit shown in FIG. 2 according to a preferred embodiment of the present invention.

Referring to FIG. 5, the fuse blow out (FBO) circuit 30 forces the fuse F70 to blow out when the LED current is lower than 20% of its nominal value. If that condition occurs, the link between voltage $V_{IN}$ and the input power switch circuit 22 is permanently opened, as the mosfets Q70 and Q71 open and the PSU 18 turns off. The LED module 1 will then be unusable anymore and the system's CFT (cold filament test) circuit 32 detects a failure.

A time delay circuit 40 has been implemented in order to provide enough time to the PSU 18 to turn on (100 to 170 ms) and sufficiently short to blow the fuse F70 in a flashing mode (330 ms). The time delay is obtained from the time constant given by resistors R50, R51 and capacitor C50. Capacitor C50 (1 uF) charges through resistor R50 (523 k) up to half $V_{REF}$ (2.4V) and is fed to line 3 of comparator U50A via resistor R53. At turn-off, resistor R51 provides a path to ground to discharge capacitor C50. In order to minimize the offset voltage of the comparator U50A, the resistance value of resistor R52 matches the input impedance at line 3 of comparator U50A (parallel combination of resistors R53 and R54). Resistors R53 and R54 provide the comparator threshold voltage, at line 2 of comparator U50A, which matches 63% of half $V_{REF}$ (1.5V). Capacitor C50 being 1 μF, the time delay is easily computed by dividing the value of resistor R53 by 2 where the result is in milliseconds (1 uF×523 k/2=262 ms).

At turn-on, capacitor C50 charges only during 50 ms, typically, and is clamped by diode D50 to ground by line 7 of comparator U50B when 20% of LED current $I_{LED}$ is reached, as described above with regard to the Led current detection circuit 38. The clamping voltage is about 0.5V at 25° C. and will vary at hot and cold temperature. In case of a failure occurrence, where line 7 of comparator U50B is floating after turn-on, then capacitor C50 starts charging from 0.5V toward 2.4V and reaches a 1.5V comparator threshold voltage faster but this does not cause any concern. Line 1 of comparator U50A becomes floating when capacitor C50 charges above 1.5V, voltage $V_{CC}$ is applied to the gate of the power mosfet Q50 via resistor R55, mosfet Q50 saturates pulling to ground diode D55, and the +10 Vdc input voltage appears across fuse F70 and fuse F70 blows out. In normal operation, line 7 of comparator U50B is shorted to ground, line 1 of comparator U50A maintains the mosfet's Q50 gate to ground and the FBO command is disabled. Diode D54 limits the gate-source voltage of mosfet Q50 below its maximum limit of 20V. The purpose of diode D55 is to isolate fuse F70 from voltage $V_{CC}$ when the FBO circuit 30 is enabled.

Cold Filament Test (CFT) Circuit

Originally, the Cold Filament Test (CFT) has been incorporated to verify if the filament of the incandescent lamp is open or not. The system controller supplies the lamp for 2 ms and checks the lamp current. Of course, 2 ms is too short for an incandescent lamp to radiate light and is sufficient to validate its status. The same test may be performed on the LED module 1 to check it.

Figure 6:
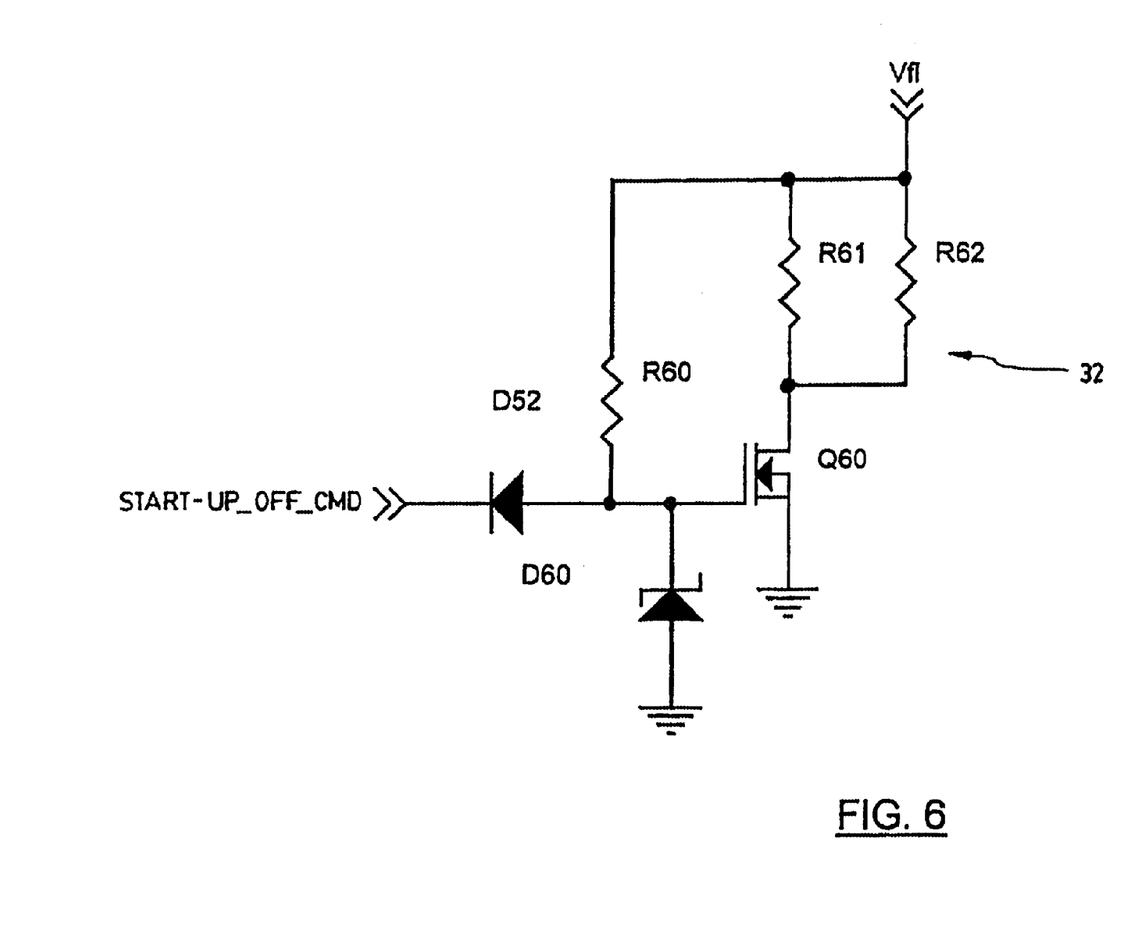
FIG. 6 is an electrical circuit diagram of a cold filament test circuit shown in FIG. 2 according to a preferred embodiment of the present invention.

When the system controller applies the input voltage to the PSU 18, the input power switch circuit 22 turns on and capacitor C1 starts to charge up. The voltage across capacitor C1, $V_{FL}$, is applied directly to the gate of mosfet Q60 via R60 (see FIG. 6). Typically, mosfet Q60 starts to conduct when $V_{FL}$ reaches 4.2V. $V_{FL}$ rises up to the +10 Vdc input line voltage. Mosfet Q60 saturates and connects resistors R61 and R62 to ground providing 7.5 ohms across the +10 Vdc input line voltage. The system controller starts monitoring the LED module's input current after the application of the input voltage and the current must be greater than a pre-determined value, otherwise the test fails. The load current of the CFT circuit 32 combined with the dummy load current and the inrush current of capacitor C1 during turn-on provides the necessary current at 8 Vdc. Diode D60 limits the gate-source voltage of mosfet Q60 below its maximum limit of 20V.

In normal operation during turn-on, the CFT circuit 32 stays enabled until 20% of the LED current is reached. Then, line 7 of comparator U50B (see FIG. 4) goes low and the gate of mosfet Q60 is kept below the gate threshold voltage via diode D52 disabling the CFT circuit 32.

Start-Up Circuit

Figure 7:
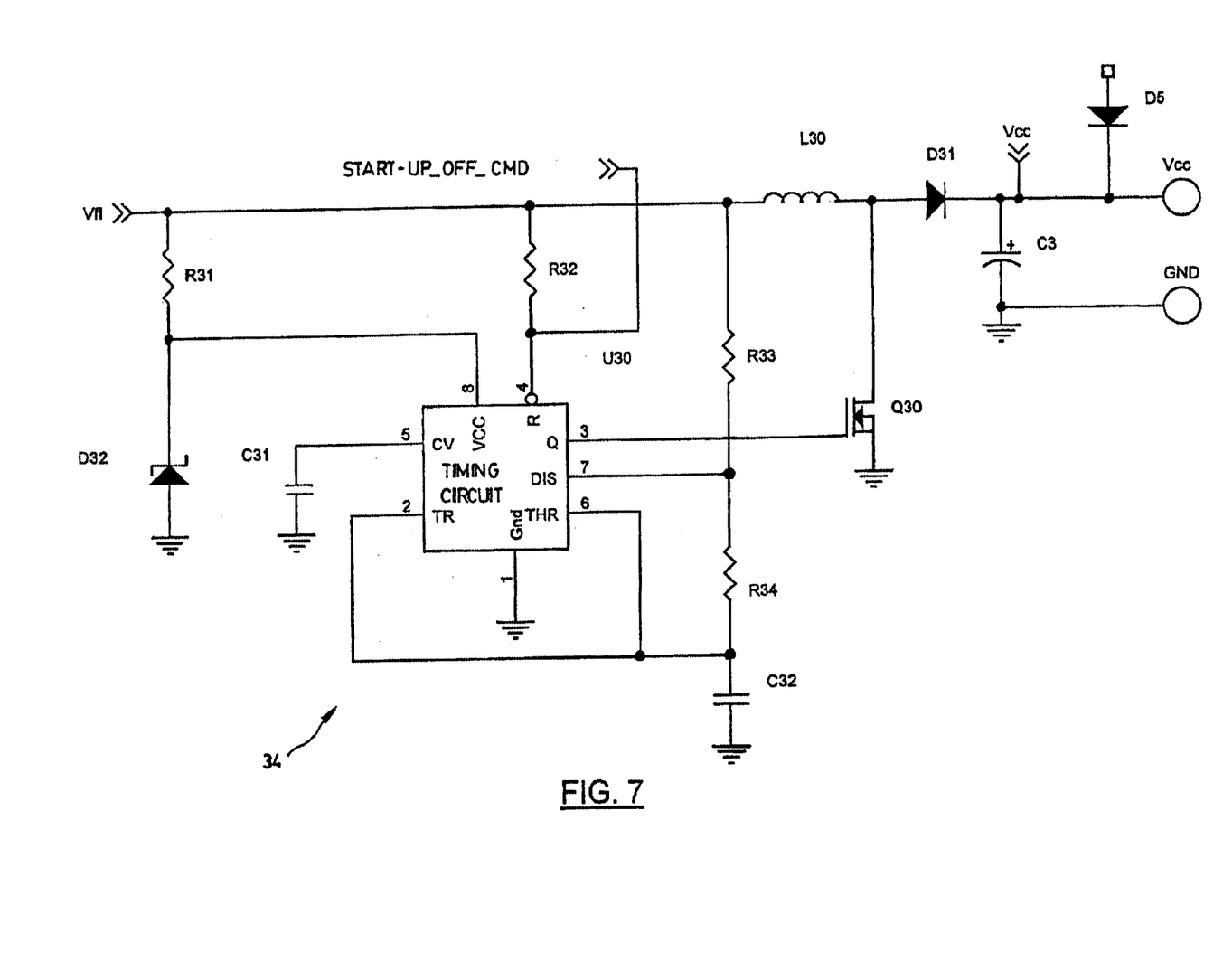
FIG. 7 is an electrical circuit diagram of a boost converter start-up circuit shown in FIG. 2 according to a preferred embodiment of the present invention.

Referring to FIG. 7, the start-up circuit 34 that is shown in FIG. 2 is a switch-mode boost converter that uses the voltage across capacitor C1, $V_{FL}$, (shown in FIG. 3) to generate voltage $V_{CC}$. The duty cycle is constant and set to get an output voltage of 15V for an input voltage of 7V. The Pulse Width Modulator (PWM), U1 (shown in FIG. 9), needs 15V to start up. The start-up circuit 34 stays enabled until 20% of the LED current is reached. The start-up circuit stops feeding $V_{CC}$ and lines 6 and 10 of transformer T1 start feeding $V_{CC}$ via resistor R49 and diode D5 (shown in FIG. 9).

The boost converter is fed from $V_{FL}$ and is made of inductor L30, mosfet Q30, diode D31 and capacitor C3. Inductor L30 builds energy in its core when mosfet Q30 is ON and inductor L30 transfers its energy to capacitor C3 via diode D31 when mosfet Q30 is OFF. Mosfet Q30 is driven at a constant rate of 50% provided by timer circuit U30 and the voltage at capacitor C3 is about twice $V_{FL}$. Line 3 of timer circuit U30, SE555CN Timer, works in the a stable mode where the duty cycle is set by resistors R33, R34 and capacitor C32. The supply voltage at line 8 of timer circuit U30 is limited to 14V by diode D32. Voltage $V_{FL}$ could reach 36V for 80 ms. Resistor R31 is the bias resistor of diode D32. Capacitor C31 is a high frequency bypass capacitor used to filter the control voltage at line 5 of timer circuit U30. The reset at line 4 of timer circuit U30 is kept high by the pull-up resistor R32 to ensure the operation at line 3 of timer circuit U30. The start-up circuit 34 stays enabled until 20% of the LED current is reached. Then, line 7 of comparator U50B (shown in FIG. 4) goes low pulling down to ground the reset pin at line 4 of timer circuit U30 to disable line 3 of timer circuit U30.

Quick-Bleeder Circuit

Figure 8:
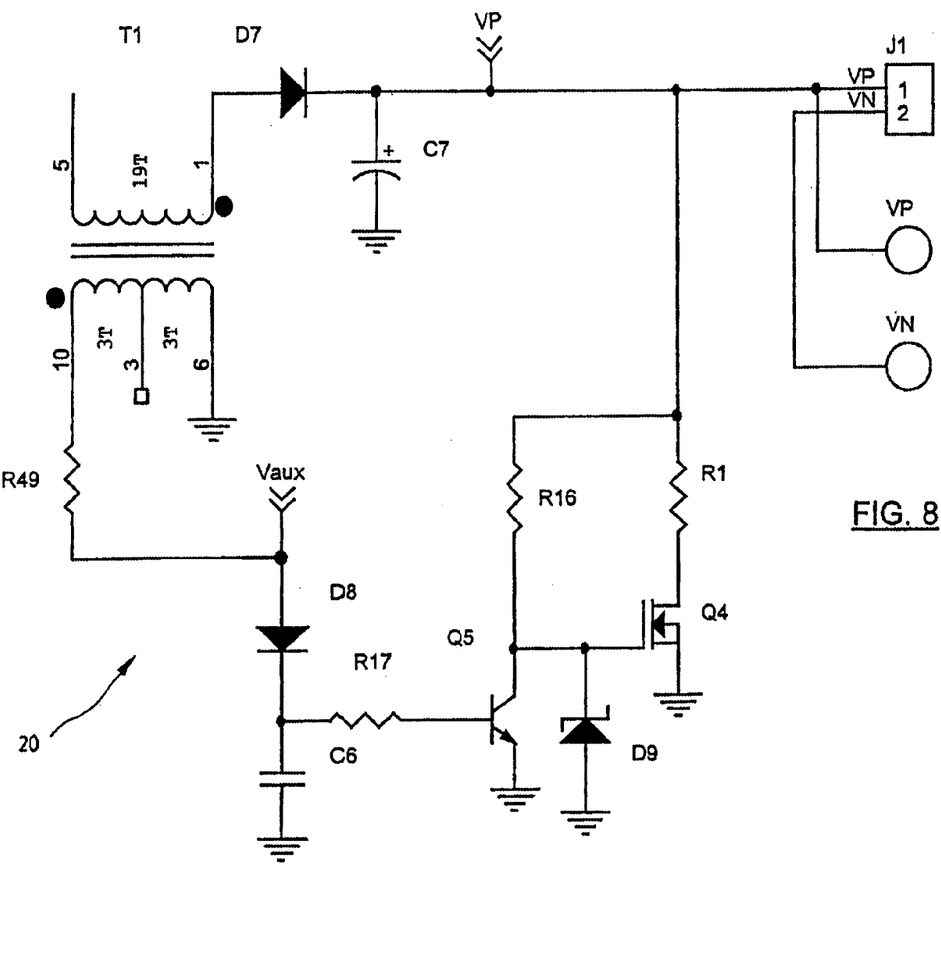
FIG. 8 is an electrical circuit diagram of a bleeder circuit shown in FIG. 2 according to a preferred embodiment of the present invention.

Referring to FIG. 8, the purpose of the quick-bleeder circuit 36 (also shown in FIG. 2) is to turn off faster the LED module 1. The bleeder circuit 36 uses a peak voltage detector to monitor the switching waveform voltage of transformer T1. At turn-off, the switching waveform voltage disappears and a 1 Kohm resistor R1 is shunted across the output capacitor C7 to force capacitor C7 to discharge faster.

The auxiliary voltage, $V_{AUX}$, is a square waveform that is used to feed $V_{CC}$ via diode D5 (shown in FIG. 7). Capacitor C6 charges up to $V_{AUX}$ via resistor R49 and diode D8. Diode D8 prevents capacitor C6 from discharging when $V_{AUX}$ is 0V. Capacitor C6 discharges slowly through resistor R17 and transistor Q5, based on a time constant established by capacitor C6 and resistor R17. Capacitor C6 recharges at the beginning of each cycle of $V_{AUX}$. The saturation of transistor Q5 is maintained as long as the Voltage across capacitor C6 is sufficient to drive the base current such as the forced hFE is greater than 15 (forced hFE=Ic/Ib). The collector of transistor Q5 forces the gate of transistor Q4 to ground thus keeping transistor Q4 OFF.

The LED module turn-off command occurs when the system controller removes the +10 Vdc from the input voltage line. The input power switch circuit 22 turns off and the switching waveform voltage $V_{AUX}$ stops when the energy of the input filter made of inductor L1 and capacitor C1 vanishes. Capacitor C6 stops recharging and discharges slowly toward 0V at a time rate of 100 μs. After 500 uμs, transistor Q5 turns off, the gate of transistor Q4 charges up to 14V, limited by diode D9, via resistor R16. Transistor Q4 turns on when $V_{GS}$ exceeds 4.2V and resistor R1 is pulled down to ground. Capacitor C7 discharges through the LEDs and resistor R1. Without the use of the bleeder resistor R1, capacitor C7 would discharge at a constant rate established by the characteristic $V_F$–$I_F$ of the LEDs down to $V_F$ minimum. At $V_F$ minimum, $I_F$ is very small and capacitor C7 would discharge even slower. The resultant would be that the LEDs would still emit light that would be detected by the eyes. Resistor R1 will force capacitor C7 discharging down to 0V in a short period of time.

Boost Power Stage Circuit

Figure 9A:
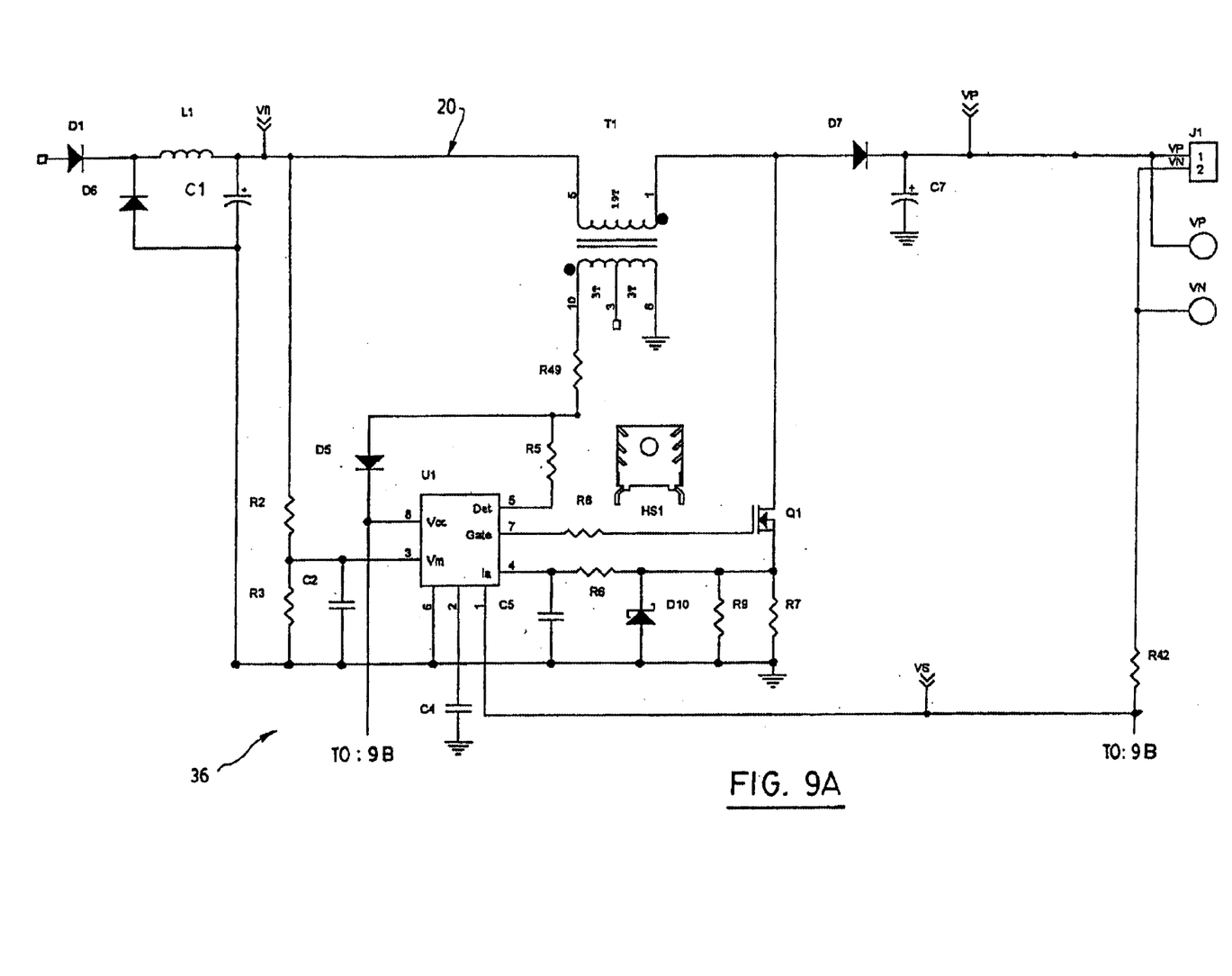
FIG. 9 is an electrical circuit diagram of a power stage circuit shown in FIG. 2 according to a preferred embodiment of the present invention.
Figure 9B:
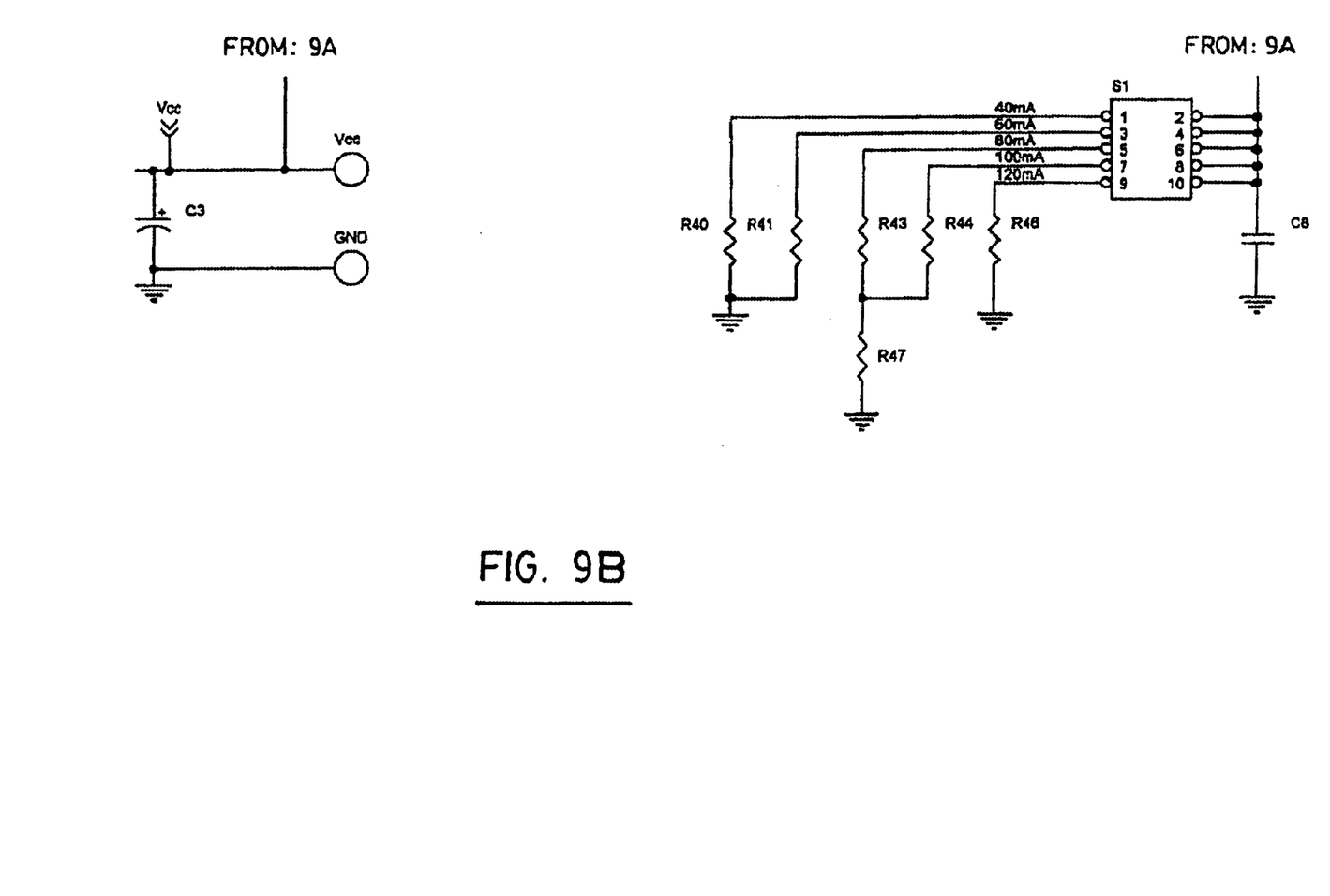

Referring to FIG. 9, the boost power stage circuit 20 that is shown in FIG. 2 is a switch-mode converter that transforms the +10 Vdc voltage across capacitor C1, $V_{FL}$, to a constant output DC current to feed the LEDs. That way the LEDs emit constant light. A boost converter topology is used since the resultant voltage across the LEDs is 57V for 22 Red LEDs, 75V for 33 Yellow LEDs and 52V for 15 Green LEDs.

The Pulse Width Modulator, U1, starts up when $V_{CC}$ exceeds 15V. The power stage is fed from $V_{FL}$ and is made of transformer T1 (primary winding inductance at lines 1 and 5), mosfet Q1, diode D7, and capacitor C7. Transformer T1 (at lines 1 and 5) builds energy in its core when mosfet Q1 is ON and that energy is transferred to capacitor C7 via diode D7 when mosfet Q1 is OFF. Mosfet Q1 is driven by line 7 of PWM U1 where resistor R8 limits the turn-on gate current.

The Pulse Width Modulator, U1, (MC33262) does not have an oscillator but the operation frequency is determined by the power stage. The power stage is a peak detector current-mode boost converter that operates in critical conduction mode at a fixed on-time and variable off-time. The critical conduction mode is the boundary limit between the continuous and the discontinuous conduction mode of the power inductor current leading to stable current loop without the need of slope compensation. There is no switching loss at turn-on when using the critical mode.

The off-time is determined when transformer T1 is completely discharged. The voltage at transformer T1 (lines 10 and 6), $V_{AUX}$, is fed to line 5 of PWM U1 via resistor R5. When the voltage at line 5 of PWM U1 goes below 1.5V, PWM U1 resets the drive output at line 7 of PWM U1 and mosfet Q1 turns on. The switching power stage current is sensed by the parallel combination of resistors R7 and R9.

The on-time ends when the boost inductor current reaches a determined peak value. The boost inductor current is sensed by resistors R7 and R9. The resultant sensed voltage is filtered by resistor R6 and capacitor C5 and fed to line 4 of PWM U1. The voltage at line 4 of PWM U1 is compared to a voltage reference established by the product combination of the voltage at lines 2 and 3 of PWM U1. The power mosfet Q1 turns off when the voltage at U1-4 exceeds the voltage reference. The voltage at U1-3 is proportional to the input voltage $V_{FL}$ determined by the voltage divider made of resistors R2 and R3 thus allowing feedforward compensation for the input voltage variations. The voltage across the LEDs current sense resistor is fed to line 1 of PWM U1 and internally inverted. That feedback voltage is available at line 2 of PWM U1 where capacitor C4 is used to compensate the loop. The LEDs current being constant, the peak current of transitor T1 at lines 1 and 5 is directly proportional to the input voltage and the on-time remains constant.

Capacitor C2 is a high frequency bypass capacitor used to filter the feedforward voltage at line 3 of PWM U1. Diode D10 clamps the voltage at −0.2V to prevent false triggering.

The power stage provides the feature to select the LEDs current using a shunt with S1. The current selection is: 40 mA, 60 mA, 80 mA, 100 mA and 120 mA. Current sense resistors R40, R41, R43-R47 are used to set the LEDs current at the predetermined value shown above. In normal operation, the voltage is regulated to 2.5V at line 1 of PWM U1 and the current value is obtained by dividing 2.5V by the current sense resistor. Resistor R42 and capacitor C8 is a low pass filter to attenuate the switching ripple across capacitor C7.

Although the present disclosure describes particular types of transistors in the different circuits shown in the Figures, it should be kept in mind that these different types of transistors can be substituted or replaced by other available types of transistors.

Although preferred embodiments of the present invention have been described in detail herein and illustrated in the accompanying drawings, it is to be understood that the present invention is not limited to this precise embodiment and that various changes and modifications may be effected therein without departing from the scope or spirit of the present invention.

What is claimed is:

1. A module for powering and monitoring a light-emitting diodes load by means of a power line, the module comprising:
    an input power switch circuit having an input connected to the power line for receiving power from the power line and monitoring a voltage magnitude thereof to enable and disable the module according to the voltage magnitude of the power line;
    a fuse blowout circuit having a fuse through which the input power switch circuit monitors the voltage magnitude of the power line, said fuse blowout circuit being adapted for blowing out said fuse to disable the input power switch circuit if no current flows through the light-emitting diodes load after a pre-determined time when the input power switch circuit is activated;
    a cold filament test circuit having an input connected to the power line for emulating an impedance of an incandescent light during a power stage set-up time during which no current is supplied to the light-emitting diodes load;
    a current detector circuit for detecting a current supplied to the light-emitting diodes load and for disabling the fuse blowout circuit and the cold filament test circuit when the current of the light-emitting diodes load reaches a predetermined current level; and
    a boost power stage circuit having an input connected to the power line and an output connected to the light-emitting diodes load for powering the light-emitting diodes load.

2. The module according to claim 1, further comprising a serpentine trace connected in series with the fuse of the fuse blow out circuit for disabling the input power switch circuit upon physical damage to the serpentine trace.

3. The module according to claim 1, wherein the module comprises an input filter circuit connected between the power line and the input power switch for protecting the module.

4. The module according to claim 3, further comprising a resistor connected across the power line through the input filter circuit, the resistor being controlled by the input power switch circuit for canceling out a negative slope effect on an input impedance of the module.

5. The module according to claim 3, wherein the module further comprises a start-up circuit having a first input connected to the input filter circuit and a second input connected to the current detection circuit, and having an output connected to the boost power stage circuit for starting up the module.

6. The module according to claim 3, wherein the boost power stage circuit has an output capacitor and the module further comprises a quick-bleeder circuit having an input connected to the output capacitor for forcing the output capacitor to discharge at a faster rate through a shunt resistor when the module is turned off.

* * * * *